United States Patent
Svarovsky et al.

[11] Patent Number: 5,223,778
[45] Date of Patent: Jun. 29, 1993

[54] AUTOMATIC TUNING APPARATUS FOR PID CONTROLLERS

[75] Inventors: James E. Svarovsky, Sagamore Hills; Donald F. Baechtel, Lyndhurst; Chia P. Day, Solon, all of Ohio

[73] Assignee: Allen-Bradley Company, Inc., Milwaukee, Wis.

[21] Appl. No.: 945,564

[22] Filed: Sep. 16, 1992

[51] Int. Cl.$^5$ .............................................. G05B 11/36
[52] U.S. Cl. .................................... 318/610; 318/609; 364/157; 364/158; 364/165; 364/162
[58] Field of Search ................................ 318/560–646; 364/150–179, 140–149

[56] References Cited

U.S. PATENT DOCUMENTS

| | | |
|---|---|---|
| 4,539,633 | 9/1985 | Shigemasa et al. ................. 364/162 |
| 4,754,391 | 6/1988 | Suzuki ................................ 364/157 |
| 4,791,548 | 12/1988 | Yoshikawa et al. ................. 364/149 |
| 4,914,365 | 4/1990 | Murakami et al. .................. 318/609 |
| 5,063,335 | 11/1991 | Baechtel et al. .................... 318/609 |
| 5,124,626 | 6/1992 | Thoen ................................ 318/610 |
| 5,153,807 | 10/1992 | Saito et al. ........................ 364/165 |

Primary Examiner—Paul Ip
Attorney, Agent, or Firm—Quarles & Brady

[57] ABSTRACT

An autotuning procedure for a PID-type controller employs a low frequency sine wave as an exciting input and models the controlled system as a second order linear system. The system is tuned to a desired damping ratio by following an overdamped trajectory, in closed loop gain and phase lag space, to the target closed loop gain and phase lag values on a locus of a desired damping ratio as based on that modeling system.

11 Claims, 8 Drawing Sheets

AUTOMATIC TUNING APPARATUS FOR PID CONTROLLERS

BACKGROUND OF THE INVENTION

1. Field of the Invention

This invention relates to proportional-integral-derivative ("PID") controllers such as are used for the control of servo systems and the like, and in particular, to an apparatus for automatically setting the gain values associated with the proportional, integral, and derivative terms of the controller, that is, for "tuning" the controller.

2. Background Art

Feedback controllers, for example, feedback controllers used for controlling the positioning of a motor system, accept a position command indicating the desired position of the motor and a response or feedback signal indicating the actual position of the motor. From these signals, the controller produces a torque command or velocity command to the motor system, such torque or velocity command being calculated to bring the feedback signal into closer agreement with the position command.

In a simple controller, the feedback signal of position is subtracted from the position command to produce an error signal and the velocity command is proportional to the error signal. In more complex controllers, the torque or velocity command is a more complex function of the error signal.

The exact functional relationship between the error signal and the torque or velocity command critically affects the characteristics of the controlled motor system as reflected in criteria such as the "response time" of the system, i.e., how fast the motor moves to the desired position, "over shoot", i.e., how far the motor moves past the desired position before returning to the desired position, and the system "stability", whether the system is prone to oscillation under certain conditions. One aspect of system stability is the "damping ratio" of the system which generally describes how long the system oscillates in response to a step position command.

A variety of functional relationships between the error signal and the torque or velocity command can be obtained through the use of a PID controller which provides a generalized proportional-integral-differential function which is the sum of: (1) the error signal times a proportional gain factor ("P-gain"), (2) the integral of the error signal times an integral gain factor ("I-gain"), and (3) the derivative of the error signal times the derivative gain factor ("D-gain"). By adjusting the P, I and D-gain factors, a wide variety of transfer functions may be effected, which when combined with the physical transfer function of the servo system, produce the desired system response.

Selecting the proper P, I and D-gain factors to produce a desired system response is a subject of a considerable body of literature. If the transfer function of the physical system is well known and may be approximated by a linear system, the appropriate P, I and D gain factors may be calculated according to the desired response tradeoffs by a number of well known methods.

More typically, however, the precise transfer characteristics of the servo system are not well known and are determined by exciting the system with various inputs. With the increasing use of computers in control systems, a variety of computer controlled autotuning methods have been developed. In such computer controlled autotuning methods, the physical servo system is stimulated with a given input and the response characterized and used to adjust the PID gain factors.

Most of these autotune procedures employ a step or impulse function to measure the system response. These inputs have high frequency components and can excite instabilities and resonances that exist elsewhere in the system and which adversely affect the tuning results or cause the tuning process to fail. Certain of these autotuning procedures require the system to approach unstable behavior and then reduce the system gain by a preset amount. As the system approaches instability, high stress and damage to the system components may result and control of the system can be lost. Often such autotuning procedures must be restricted to low order, linear and low noise systems.

SUMMARY OF THE INVENTION

The present invention provides an autotuning method that has general application to PID controllers for the control of a wide range of system types. The present invention employs a low frequency sinusoid as the exciting signal thereby avoiding the stress and instability that may be caused by other tuning methods. The sinusoid also permits the successful application of the autotuning procedure to systems that are not linear or that have an order higher than second order systems.

Specifically, in the present invention, a sine wave generator produces a sine wave input signal to the PID controller and a phase detector generates a phase signal proportional to the phase difference between the input signal and a feedback signal from the system. A gain detector generates a gain signal proportional to the ratio of the feedback signal to the input signal. A damping calculator deduces a target phase difference and target gain value based on a model of a second order system having a predetermined desired damping ratio and this target phase difference and gain value are used by a gain adjuster to adjusting the proportional gain of the proportional amplifier so that the gain value equals the target gain value and the phase difference equals the target phase difference.

It is one object of the invention to provide an autotuning system that is not adversely affected by resonances and instabilities that exist in the system. The sinusoid has low harmonic components and thus avoids resonances and instabilities present in most physical systems. By employing a low frequency sine wave, the fundamental characteristics of the system are emphasized over the nonlinear aspects of the system thus making the tuning method robust against nonlinearities present in all physical systems.

In a motor system, sinusoidal position and velocity excitation commands cause the position velocity and acceleration or torque signals to be in phase quadrature as opposed to step or impulse techniques where the velocity and acceleration signals are in phase. Thus, there is a reduction in the maximum power required to excite the system for this autotuning method. This reduction in maximum power avoids the maximum power limits of the system which could affect the characterization of the system for tuning and reduces nonlinear effects and mechanical and electrical stress on the components of the system.

It is thus another object of the invention to provide an autotuning system with reduced adverse effect on the system being tuned.

The gain adjuster may first adjust the proportional gain of the proportional amplifier to an overdamped gain and overdamped phase difference prior to adjusting the proportional gain of the proportional amplifier to produce the target gain and damping values. The overdamped gain and overdamped phase difference are also deduced from a model of a second order system and based on an overdamped damping ratio greater than the desired damping ratio.

It is thus another object of the invention to provide rapid tuning of the system. The tuning procedure approaches the optimal tuning conditions from an overdamped direction insuring that regions of instability are avoided. Thus, the tuning system can start from a wide range of initial conditions and is able to rapidly retune systems without risking instabilities.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DETAILED DESCRIPTION OF THE PREFERRED EMBODIMENT

Figure 1:
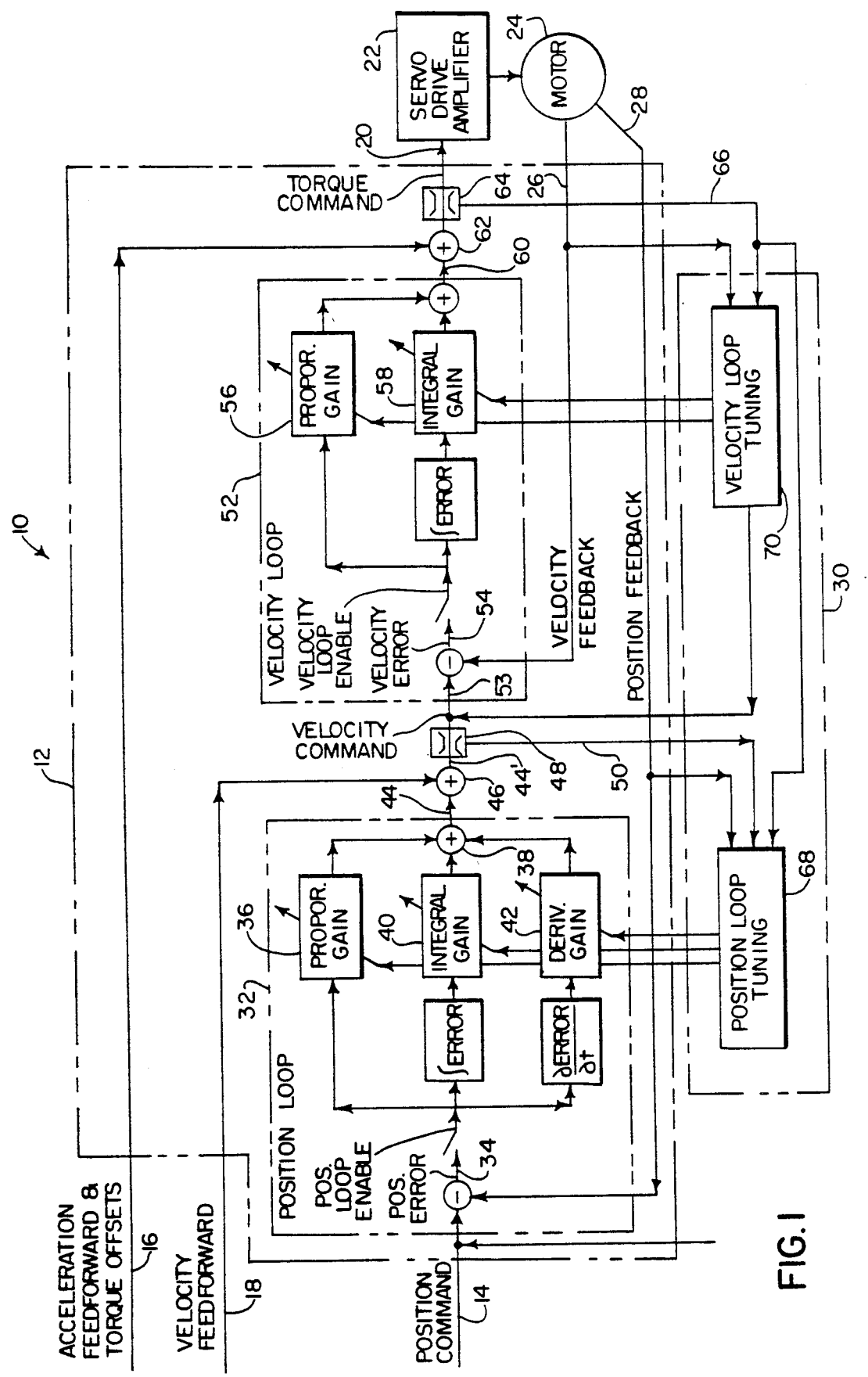
FIG. 1 is a block diagram of a servo motion controller for a motor controller showing the proportional integral and derivative gain blocks for a position loop and proportional and integral gain blocks for a velocity loop.

Referring to FIG. 1, a control system 10 includes a servo motion controller 12 for receiving a position command 14 as well as possibly an acceleration feed-forward and torque offset signal 16 and a velocity feed-forward signal 18. The servo motion controller 12 produces a torque command 20 or velocity command 53 which is received by a servo drive amplifier 22 to drive a motor 24. Attached to the motor 24 is a position encoder (not shown) which produce velocity feedback signal 26 and position feedback signal 28. The velocity and position feedback signals 26 and 28 are received by the servo motion controller 12.

The velocity feedback and position feedback signals 26 and 28 are also received by the autotuning apparatus 30 of the present invention which also receives and transmits other signals from and to the servo motion controller 12 as will be described below.

The servo motion controller 12 incorporates a PID position loop 32 which receives the position command 14 and the position feedback signal 28, subtracting the latter from the former to produce a position error 34. When the position loop 32 is enabled, the position error 34 is received by a proportional gain block 36 which multiplies the position error 34 by a adjustable gain value (P-gain) and provides that product to summing block 38. The position error 34 is also integrated and the integral of the position error 34 is received by an integral gain block 40 which multiplies the integral by an adjustable factor (I-gain) after which it is summed at summing block 38 with the product from block 36. The derivative of the position error 34 is also obtained and multiplied by a derivative gain factor (D-gain) at derivative gain block 42 after which it is summed with the outputs of blocks 36 and 40. This sum from summing block 38 is a velocity signal 44 and is the output of the position loop 32.

Velocity feed forwards 18 may be added to the velocity signal 44 at succeeding summing block 46. The output of summing block 46 is then limited to a range of velocities appropriate for the particular system by a velocity limiter 48. The velocity range of the velocity limiter 48 is determined by the physical characteristics of the motor 24 and the servo drive amplifier 22 and is typically defined by the user from a priori information. In the event that the velocity signal 44' from the summing block 46 exceeds the velocity limits of the velocity limiter 48, the velocity signal 44' is truncated at those limits and a limiting signal 50 indicative of the fact of limiting is transmitted for use by the autotuning apparatus 30 as will be described.

The output of the limiter 48 is a velocity command 53 and is received by a velocity loop 52 also within the servo motion controller 12. A PI velocity loop 52 is constructed in similar fashion to the position loop 32 but receives the velocity feedback signal 26 (rather than the position feedback signal 28) which is subtracted from the velocity command 53 to produce a velocity error 54. When the velocity loop 52 is enabled, the velocity error 54 is received by a proportional gain block 56 which operates in the same manner as proportional gain block 36 of the position loop 32. The velocity error is also integrated and received by an integral gain block 58. Each of blocks 56 and 58 has an adjustable gain which will be adjusted by the autotuning apparatus 30 as will be described.

The sum of the outputs of the proportional gain and integral gain blocks 56 and 58 form a torque signal 60 to which may be added acceleration feed forward and torque offset signals 16 by summing block 62.

The output of summing block 62 is received by a torque limiter 64 which, like velocity limiter 48, truncates the torque signal 60 if it exceeds a set of predefined torque limits as dictated by the mechanics of the servo drive amplifier 22 and motor 24. Upon any torque limiting, a torque limiting signal 66 is generated indicating the fact of torque limiting and this signal is provided t the autotuning apparatus 30. After torque limiting, the torque signal 60 is the torque command 20 provided to the servo drive amplifier 22.

The autotuning apparatus 30 includes a position loop tuning block 68 and a velocity loop tuning block 70. The position loop tuning block 68 is connected to the position loop 32 so that it may provide the position command 14 to the position loop 32 and may adjust the gain of the proportional gain block 36, the integral gain block 40, and the derivative gain block 42 of the position loop 32. The position loop tuning block 68 further receives position feedback signal 28, the velocity limiting signal 50, and torque limited signal 66.

Correspondingly, the velocity loop tuning block 70 is connected to the velocity loop 52 so that it may provide the velocity command 53 to the velocity loop 52. The velocity loop tuning block 70 also receives a velocity feedback signal 26 and the torque limiting signal 66 and controls the gains of the proportional gain block 56 and integral gain block 58 according to the method of the present invention.

The servo motion controller 12 is implemented in software, according to methods well known in the art, and runs on a digital computer with the output of the servo motion controller 12, that is, the torque command 20 or velocity command 53, being converted to an analog signal by a high speed digital to analog converter (not shown) and the feedback of the velocity feedback signal 26 and the position feedback signal 28 being converted to digital signals by hardware appropriate for the specific feedback devices (also not shown). Accordingly, the autotuning apparatus 30 of the present invention is preferably implemented as software running in the computer of the servo motion controller 12 and thus receiving the same digital signals such as the velocity feedback signal 26 and the position feedback signal 28 as received by the servo motion controller 12, and providing inputs to the servo motion controller 12 via the internal variables that represent the position command 14 and the velocity command 53. The actual position loop tuning block 68 and velocity loop tuning block 70 are therefore routines running in software alongside of the routines of the servo motion controller 12 as will be understood to those of ordinary skill in the art.

Figure 2:
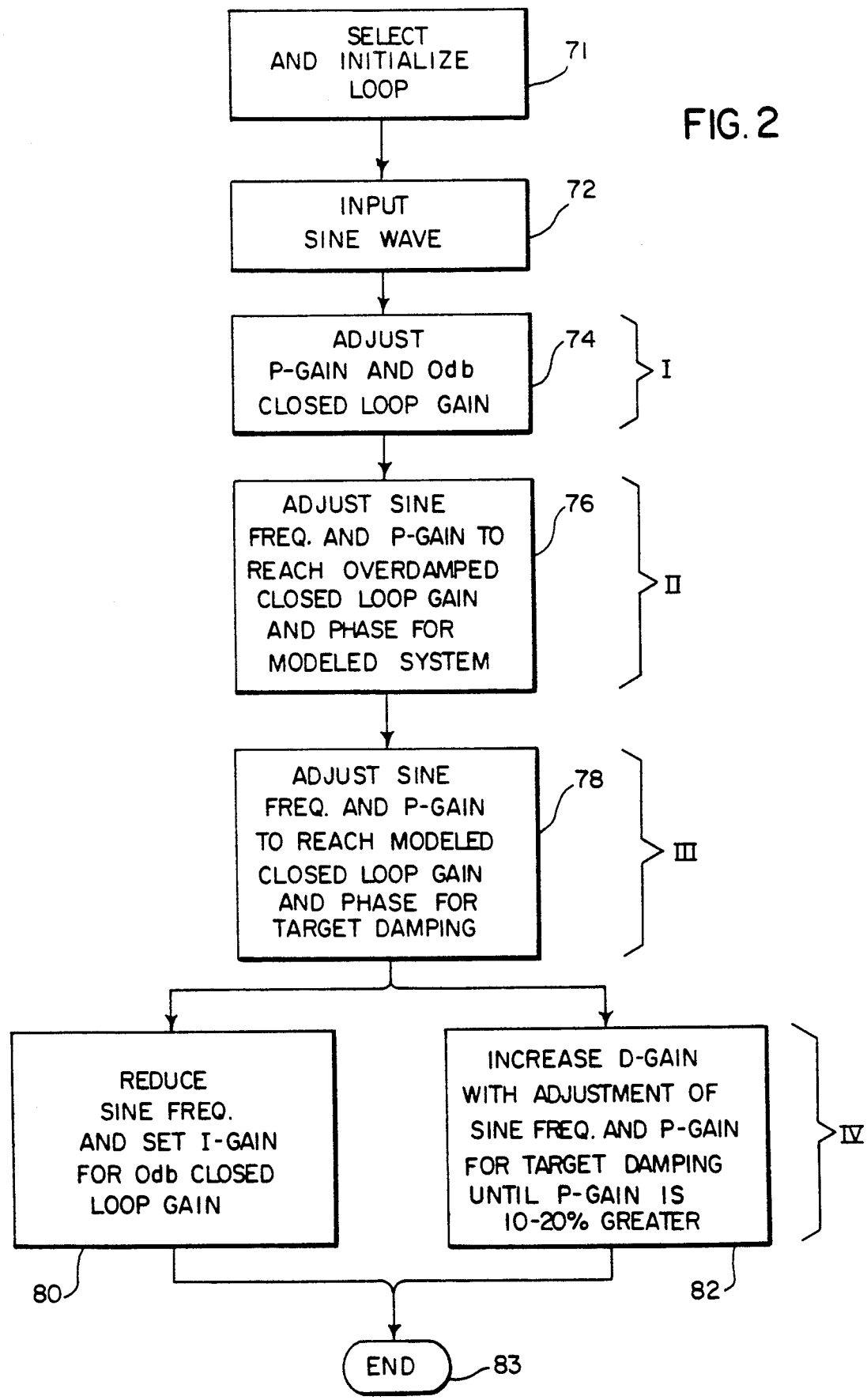
FIG. 2 is a flow chart indicating the steps of the autotuning process of the present invention including Stages I through IV.

Referring now to FIGS. 1 and 2, the autotuning procedure of the present invention operates separately on the position loop 32 and the velocity loop 52 beginning first with the innermost loop or velocity loop 52 and then progressing the outermost loop or position loop 32. The autotuning procedure for the velocity loop 52 and the position loop 32 are essentially identical in a first three Stages and differ only in their penultimate Stage as a result of different control criteria for these two loops. For simplicity, the autotuning procedure for the velocity loop 52 will be described in detail and the position loop 32 described only to the extent that it differs from the velocity loop 52.

Figure 3:
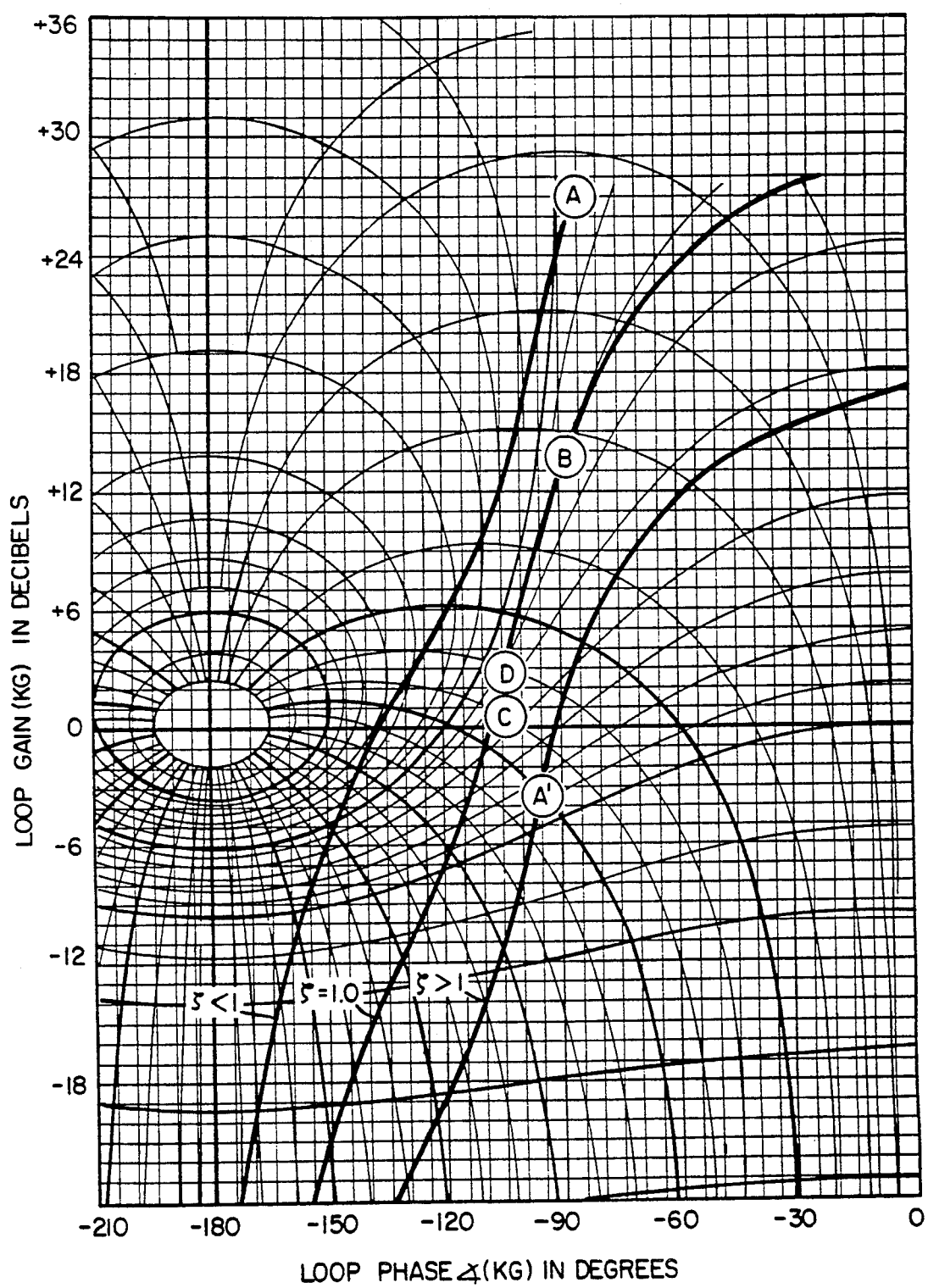
FIG. 3 is a Nichols chart showing a trajectory, in open and closed loop phase and gain space, traversed by the steps of FIG. 2.

Referring now to FIGS. 1, 2 and 3, as indicated by process block 71, the autotuning procedure first selects a particular loop, in this case the velocity loop 52 and initializes the loop. This initialization disables any acceleration feed forward or torque offset signal 16 and any velocity feed forward 18 and sets the I-gain value to zero and disables the position loop 32. The proportional gain of gain block 56 is not changed and so the tuning process may be started from a roughly tuned system, if desired, to achieve faster tuning. During this initialization of process block 71, a maximum speed and distance of movement for the motor 24 is determined from data previously provided to the servo motion controller 12. The maximum speed of the motor during tuning, as controlled by the velocity limiter 48, is set to 1/10 of the maximum programmable speed of the motor 24 as previously provided to the servo motion controller 12. The maximum distance traveled during the autotuning procedure, as determined by the amplitude of the position command 14, is limited to 1.2 times the maximum programmable speed (in units of distance/seconds) times $\frac{1}{4}$ second. This maximum distance and speed are chosen to be high enough to avoid problems caused by friction and other nonlinearities in the system but short and slow enough to minimize the distance traveled by the motor 24 during tuning so that the procedure will be applicable to most motor control systems.

During the initialization of process block 71, the operator is prompted to verify that the system is free of obstructions in both directions and provided with the calculated maximum speed and maximum distance for review. If the system is free from obstruction, then the program proceeds. Otherwise the tuning process is aborted.

At process block 72, a sine wave is presented by the velocity loop tuning block 70 to the velocity loop 52 as the velocity command 53. In the preferred embodiment, the sine wave has a frequency of one hertz to be well below the natural frequency of most velocity loops and so as to provide little if any magnitude loss in the control loop. An initial amplitude of the sine wave is set to be 1/10 of the maximum programmable speed because it is assumed that the motor 24 can run at this low frequency without exceeding the maximum current/torque limits of the motor 24. Again, this speed is high enough to avoid difficulties due to friction but low enough to minimize the distance traveled.

At process block 74, Stage I of the tuning block is begun. The purpose of Stage I is to adjust the P-gain of proportional gain block 56 so that the closed loop gain of the control system 10 is 0 decibels (db). A closed loop gain of 0 db implies that the velocity feedback signal 26 is of the same amplitude and the velocity command 53.

Referring particularly to FIG. 3, the velocity loop 52 may start in either an underdamped or overdamped state as indicated by position circles A and A' respectively. In the underdamped situation, Stage I of the autotuning procedure moves the state of the velocity loop 52 from position circle A to position circle B near the 0 db line of the Nichols chart. Thus for underdamped systems, the gain is increased. Not shown but conversely, the gain for state A is decreased, also moving the state of the velocity loop 52 closer to position circle B.

Referring again to FIGS. 1, 2, and 3, once the closed loop gain of the system 10 is set to approximately 0 db in Stage I, the program proceeds to process block 76 or Stage II where the sine wave presented as the velocity command 53 is changed in frequency until a reference closed loop phase is reached. During the changing of the frequency, the P-gain is adjusted to reach a reference closed loop gain.

Closed loop phase is the phase difference between the velocity feedback signal 26 and the velocity command 53 and is measured in the preferred embodiment by comparing the point at which the wave-forms cross a zero line according to the well understood zero crossing methods of phase detection. The closed loop gain is determined by comparing the peak value of the velocity feedback signal 26 to the amplitude of the velocity command 53.

Referring to FIG. 3, generally, position circle B will travel on a trajectory of closed loop gain versus closed loop phase from position circle B to a position circle C at approximately 45° of closed loop phase lag which in the preferred embodiment is the target closed loop phase value. The closed loop gain of position circle C is that which would be dictated by a second order linear system for a damping ratio slightly greater than that ultimately desired. Thus position circle C on an overdamped trajectory with respect to the ultimately desired tuning of the control system 10.

Once the above closed loop phase and gain values have been reached, the program proceeds to process block 78 where upon the P-gain value of proportional gain block 56 is further increased to move the gain to a target value shown in FIG. 3 as position circle D. During the increasing of the P-gain, the frequency of the sine wave input of the velocity command 53 is also adjusted to maintain the reference closed loop phase value. The phase and the closed loop gain values maintained at position D are those that in a second order linear system would provide for the ultimately desired damping ratio, typically a damping ratio of 1 or "critical" damping. Thus, position circle D identifies a trajectory of critical damping through the space of the Nichols chart on which it is desired that the control system 10 operate.

Stages I through III for the velocity loop 52 are essentially identical for the position loop 32, with the obvious exception that the position loop deals with the position command 14 and position feedback signal 28. However, at Stage IV, the procedure for tuning the velocity loop 52 differs from that of position loop 32 as indicated by process block 80 for the velocity loop 52.

During Stage IV of process block 80, the sine frequency used for the velocity command 53 is reduced and the I-gain for integral gain block 58 is set to achieve 0 db closed loop gain for that sine frequency.

After block 80, the sine wave amplitude is deceased and the autotuning process ends at process block 83.

In the case of the position loop 32, the Stage IV is indicated by process block 82 and requires that the D-gain value of the derivative gain block 42 be increased, with corresponding adjustments in the sine frequency and the P-gain of proportional gain block 36, to maintain the target damping ratio until the P-gain is 10 to 20% greater than it was before the adjustment of the D-gain value from its initial value of zero.

At the conclusion of process block 82, the sine wave input to the position command 14 is again terminated at process block 83.

At this point, if the velocity loop 52 was being tuned, the position loop 32 is now tuned. If the position loop 32 was being tuned, the autotuning procedure ends and the control system 10 is available for use.

The modeled closed loop gain and phase values used in this tuning process are selected to achieve a given damping ratio, typically that of critical damping. The value of damping may be deduced from measured closed loop phase and gain by modeling the control system 10 as a second order system—as is implicit in the Nichols chart topography of FIG. 3. Accordingly, the damping ratio produced by the closed loop phase and the closed loop gain represented by position circle D is an approximation based on a modeling of the system as a second order system. This modeling is generally acceptable when the control system has a pair of dominant poles removed from other roots of the system.

The difference between Stage IV for tuning the position loop 36 and the velocity loop 52 reflects a difference in desired response for these two loops. The position loop 32 is adjusted primarily for zero position overshoot, and secondarily for rapid response, because zero position overshoot is an important criterion for most positioning applications. The I-gain for the position loop 32 remains set at zero because the integral term will cause system overshoot for most systems. Conversely, the velocity loop 52 may tolerate some overshoot as long as the loop has a rapid rise time and is relatively stable to sudden changes in the velocity command 53. The I-gain value of the integral gain block 58 is set to improve velocity regulation at low speeds and to enable the velocity to adjust to changes in the system behavior caused by friction, gravity loading, torque response and other similar influences.

DETAILED DESCRIPTION OF THE STAGES I THROUGH IV

Figure 4:
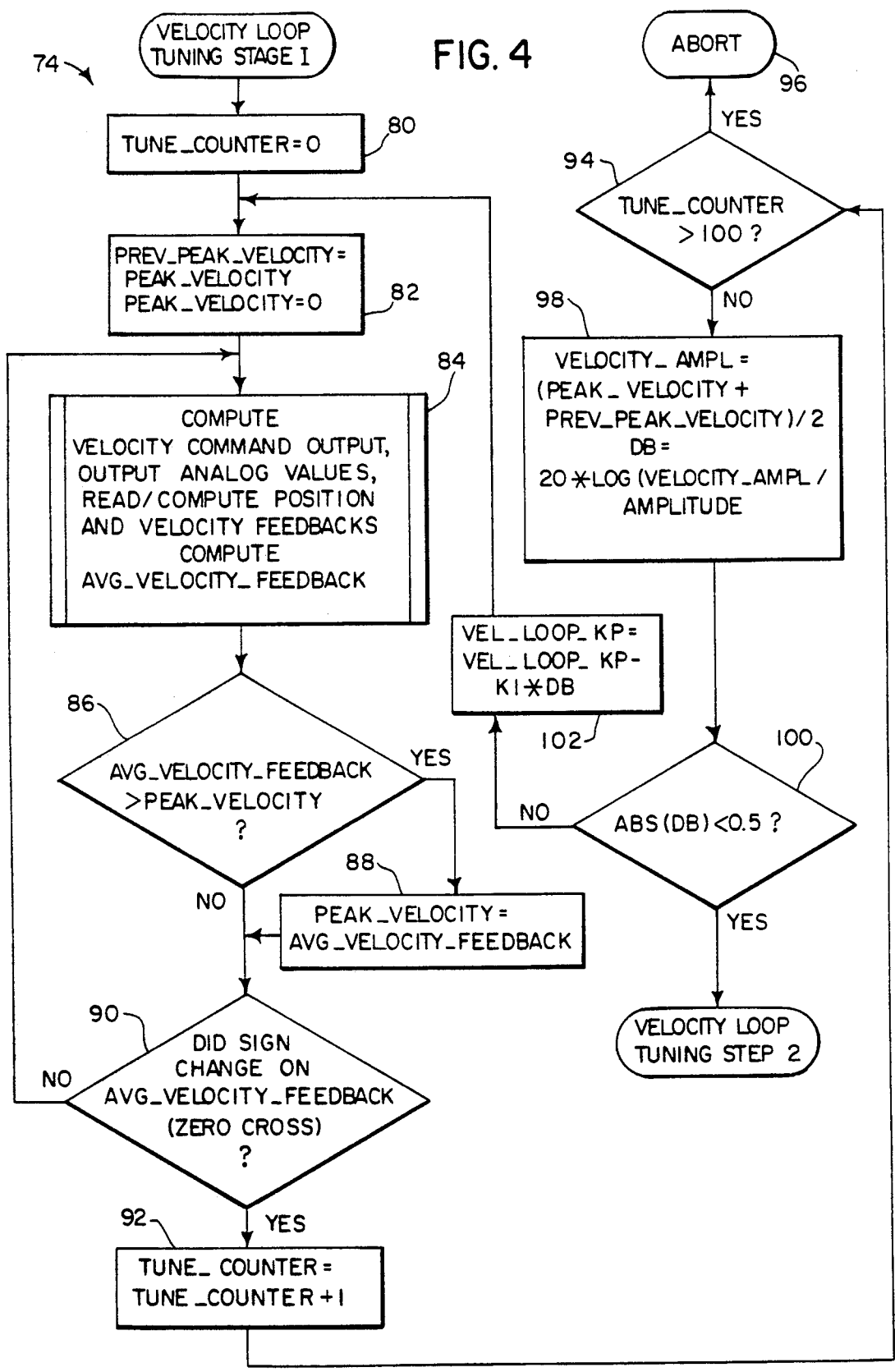
FIG. 4 is a detailed flow chart of the steps employed in Stage I of FIG. 2.

Referring to FIG. 4, the purpose of Stage I is to adjust the P-gain factor of the proportional gain block 56 of the velocity loop 52 so that the closed loop gain is approximately 0 db. This step will increase the P-gain factor for heavily overdamped systems and decrease the P-gain factor for underdamped or unstable systems.

As indicated by process block 80 of FIG. 4, the first step of Stage I is the initialization of a variable Tune Counter to zero. Tune Counter is incremented every time the velocity feedback signal 26 crosses zero and causes Stage I to abort, if Tune Counter exceeds a preset limit of 100. This prevents the tuning process from entering an infinite loop in an event of some failure of the control system 10 or of the tuner 30.

At process block 82, two additional variables are initialized: Prev Peak Velocity and Peak Velocity. Prev Peak Velocity holds the current value of Peak Velocity and Peak Velocity is set equal to zero. Peak Velocity simply tracks the peak velocity of the velocity feedback signal 26 during the last half sinusoidal cycle of the velocity feedback signal 26, whereas Prev Peak Velocity is simply the previous value of Peak Velocity.

At process block 84, the sine wave to be input as the velocity command 53 is computed by reading a lookup table of sine values stored in computer memory, a technique known to those of ordinary skill in the art, the sine values having the appropriate amplitude and frequency or being scaled appropriately, and providing the velocity command to the velocity loop 52. An analog torque command 20 is then generated by the controller 12 and output to the servo drive amplifier 22 and velocity feedback signal 26 is sampled. The velocity feedback signal 26 is averaged over several samples to reduce its noise content and saved as the variable Avg Velocity Feedback.

The program then proceeds to decision block 86 where Avg Velocity Feedback is compared with Peak Velocity. If Peak Velocity is smaller, Peak Velocity is set equal to Avg Velocity Feedback. Thus at process block 88, the peak value of the Avg Velocity Feedback is always stored in Peak Velocity.

If at decision block 86, Avg Velocity Feedback is less than the Peak Velocity, then at decision block 90 Avg Velocity Feedback is examined to see whether there was a zero crossing of the velocity feedback signal 26. The zero crossing is detected by comparing the last two values of Avg Velocity Feedback to see whether there was a sign change. If there was no sign change and thus no zero crossing, the program simply loops back to process block 84 to receive another velocity feedback signal 26.

If on the other hand, there was a zero crossing at decision block 90, at process block 92, the variable Tune-Counter is incremented and at subsequent decision block 94 Tune Counter is checked to see whether more than a predetermined number of zero crossings have occurred. If so, the program is aborted at process block 96.

Otherwise, at substantially the instant of the zero crossing and as indicated by process block 98, Peak Velocity and the Prev Peak Velocity are averaged to create a velocity amplitude value (Velocity Ampl) and the closed loop gain of the velocity loop (DB) is computed by dividing Velocity Ampl by the amplitude of the sine wave velocity command 53. This gain is calculated in decibels according to the well understood convention. The averaging of the Peak Velocity and Prev-Peak Velocity is intended to reduce the effect of any torque offset in the servo drive or asymmetric response to a torque command output 20 which may cause the amplitude of the velocity feedback signal 26 to be different in the positive and negative directions.

At decision block 100, the closed loop gain in decibels is checked to see whether it is in within one half decibel of 0 db, the target closed loop gain. If so, Stage I is completed but if not, at process block 102, the value of P-gain as represented by the variable Vel Loop KP is decremented by a fraction of the closed loop gain value determined by a variable K1. The variable Vel Loop KP is checked to make sure that it is never less than zero which would cause the velocity loop to lose control.

The value of K1 is selected empirically but should be large enough so that Stage I will complete the reduction of the loop gain to 0 db within a reasonable length of time but not so large as to cause the closed loop gain to vary about the 0 db target in such a way that the termination threshold of plus or minus 0.5 db is never satisfied.

Figure 5:
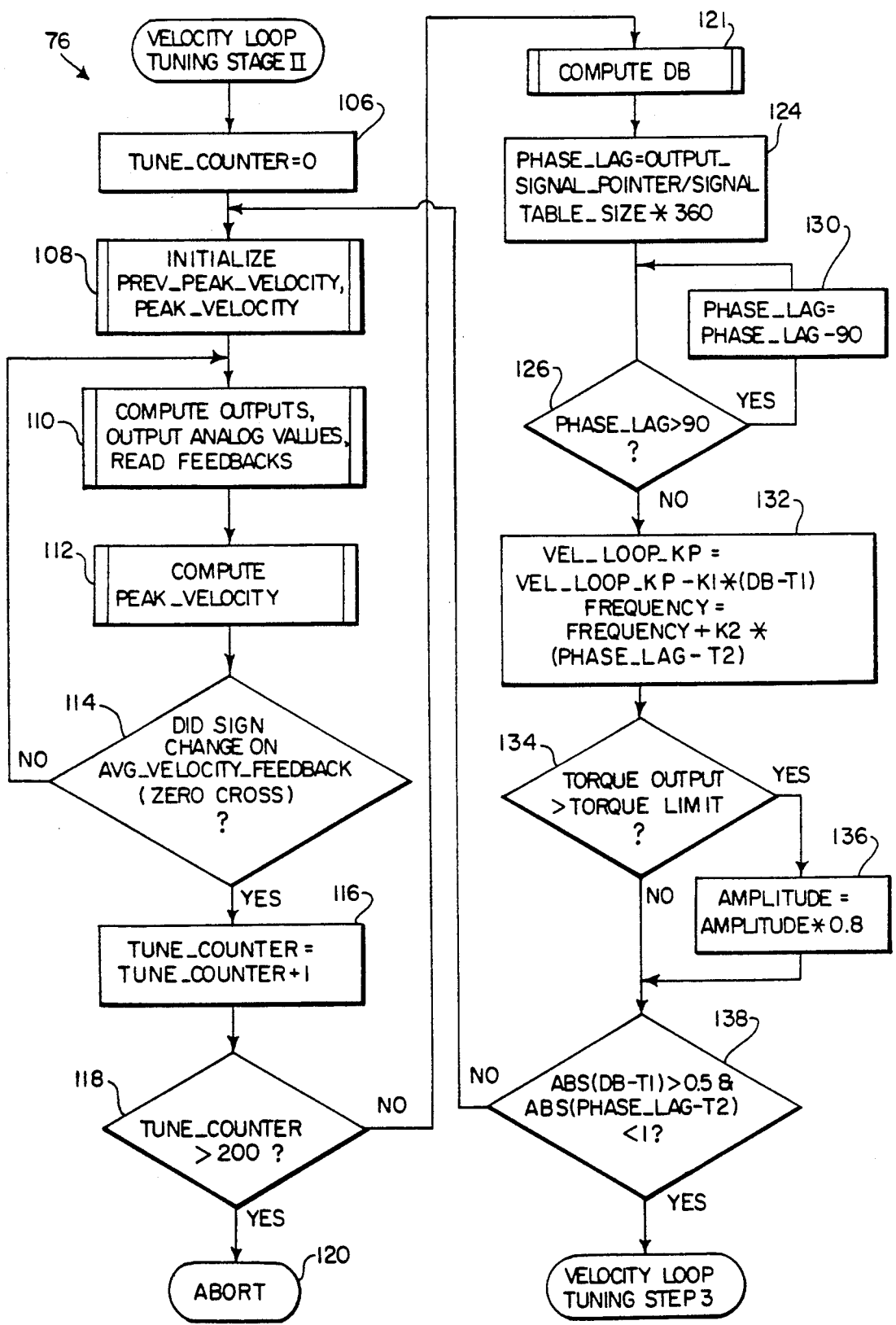
FIG. 5 is a detailed flow chart of the steps employed in Stage II of FIG. 2.

Referring now to FIG. 5, Stage II of the tuning procedure, indicated by process block 76 in FIG. 2, is intended to increase the frequency of the velocity command 53, provided by the velocity loop tuning block 70, (shown in FIG. 1) until the velocity feedback signal 26 lags the velocity command 53 by a predetermined phase lag amount designated T2. In the preferred embodiment, T2 is 45°. Stage II also simultaneously adjusts the P-gain value to maintain the close loop gain to a value of T1 within ½ db.

The value of T1 is deduced by modeling the control system 10 as a second order system and selecting a desired damping ratio. If the damping ratio is one, that of critical damping, at 45° phase lag, the closed loop gain will be −1.38 db. These values can be computed from the second order characteristic equation or read from the Nichols chart of FIG. 3 which represents a second order system. T1 is then set to one decibel less than the ultimate target closed loop gain which will be realized in Stage III, or for an ultimate critical damping of one. −2.38 db.

It will be understood that for a given selected damping ratio, a variety of target closed loop gain and phase pairs for a second order system are possible. In the preferred embodiment, a gain and phase pair are selected that can be obtained at low frequencies where the system is well behaved and where there is a large separation between the system's damping ratios, as reflected in closed loop gain and phase lag, to make the tuning accurate. The decrease in the value of T1 by one decibel from the ultimately desired gain insures that the tuning procedure always approached the critically damped target point from a slightly overdamped direction making the tuning results more consistent for overdamped and underdamp systems.

At process block 106 of Stage II, Tune Counter is again initialized to zero. After the tune-counter has been initialized to zero at process block 106, the velocity command 55 and the corresponding velocity feedback signal 26 are read and closed loop gain (DB) is again calculated, at process blocks 108 through 121 which operate in the same manner as process blocks 82 through 98 as described in detail with respect to FIG. 4.

At process block 124 in the preferred embodiment, the variable Phase Lag is computed by determining the phase of the velocity command signal 53 from the lookup table and assuming that the phase lag of the velocity feedback signal 26 does not exceed plus or minus 90°. Process block 124 is only reached if a zero crossing has been detected at process block 114 (corresponding to process block 86 of FIG. 4) and hence it can be assumed that the phase of the velocity feedback 26 is either zero or 180°. Thus the phase difference of the velocity command signal 53 is simply the address of a pointer in the sine wave lookup table divided by the table size times 360°. It is initially assumed that the zero crossing of the velocity feedback signal 26 was at 0°. If it was in fact at 180° then the computed phase lag will much larger than 90° and at decision block 126, the program is diverted to process block 130, where the Phase Lag variable is reduced by 90°, and returns to decision 126 until the value of Phase Lag is less than 90°. This less than 90° Phase Lag value will be the actual phase lag of the velocity feedback signal 26 with respect to the velocity command 53.

Process block 132, succeeding decision block 126, adjusts the P-gain of proportional gain block 56 by a fraction (K1) of the difference between the actual closed loop gain (DB) minus the target gain (T1). Likewise the frequency of the sine wave generated by the velocity loop tuning block 70 as the velocity command 53 is adjusted by a fraction (K2) of the difference between the computed phase lag (Phase Lag) and a phase lag value (T2). The magnitude of K2 is selected empirically so that the change of frequency is relatively quick but not so quick that the tolerance of plus or minus 1° of phase lag is never satisfied.

At process block 134, the torque limit is checked as predefined by the operator and as indicated in FIG. 1 by torque limiter 64 and if the torque limit is exceeded at process block 136, the amplitude of the sine wave used as the velocity command 53 is reduced by 80%.

Provided that the torque is within limits at decision block 138, the difference between the actual closed loop gain and the target closed loop gain and the actual phase and the target phase is checked to see if they are within tolerances of 0.5 db and one degree respectively. If so, Stage II is exited. If not, the program loops back to the beginning of process block 108 immediately following the initialization of Tune Counter in process block 106.

Figure 6:
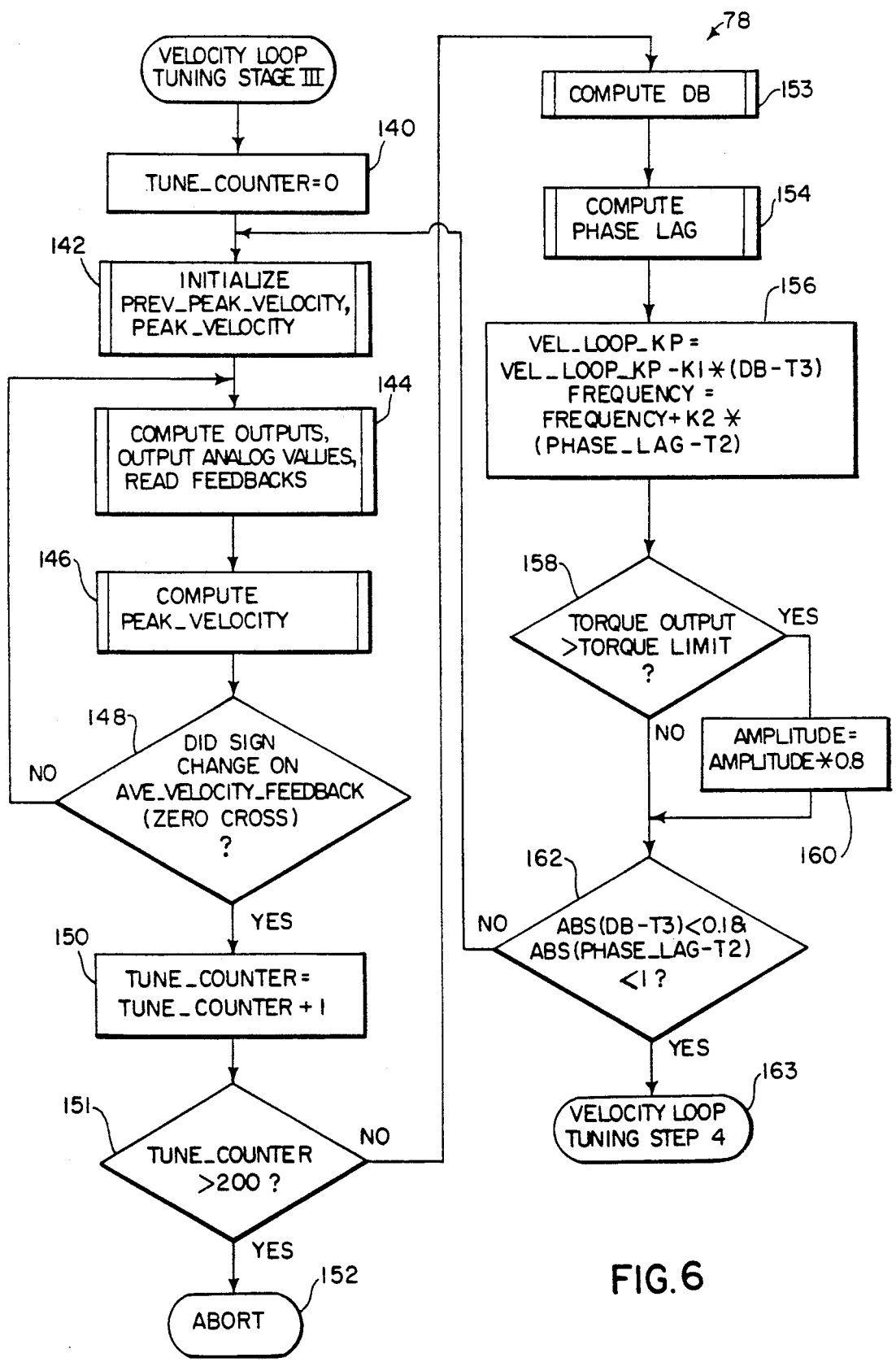
FIG. 6 is a detailed flow chart of the steps employed in Stage III of FIG. 2.

At the end of Stage II, the velocity loop 52 will be near the target gain and phase lag associated with the desired critical damping but in a slightly overdamped state. Referring now to FIG. 6, Stage III of the tuning process, indicted by process block 78 in FIG. 2, fine tunes the frequency of the velocity command 53 until the velocity feedback signal 26 lags by exactly T2 degrees, while continuing to adjust the P-gain of the proportional gain block 56 to the desired closed loop gain of T3 plus or minus 0.1 db. The fine tuning of Stage III is identical to Stage II except that the exact target amplitude T3 is used instead of the overdamped value of T1. For a critically damped velocity loop 52, the target amplitude will be minus 1.38 db at 45° of phase lag.

Thus, referring to FIG. 6, process blocks 140 through 154 which initialize variables and calculate loop gain and phase lag are essentially identical to process blocks 106 through 130 of FIG. 5.

At process block 156 which corresponds to process block 132 of FIG. 5, the variable Vel Loop KP, being the P-gain value of the proportional gain block 56, is adjusted according to a fraction (K1) of the difference between the close loop gain (DB) and the target gain value (T3). The frequency of the velocity command is adjusted in an identical manner to that of process block 132 of FIG. 5.

After process block 156 of FIG. 6, the torque limit is again checked and the tolerance ranges of the close loop gain and close loop phase are evaluated in process blocks 158 through 162 which correspond to process blocks 134 through 138 of FIG. 5. Stage III is then exited at process block 163.

Stage IV differs for the velocity loop 52 and for the position loop 32 as a result of different system criteria for these two loops.

Figure 7:
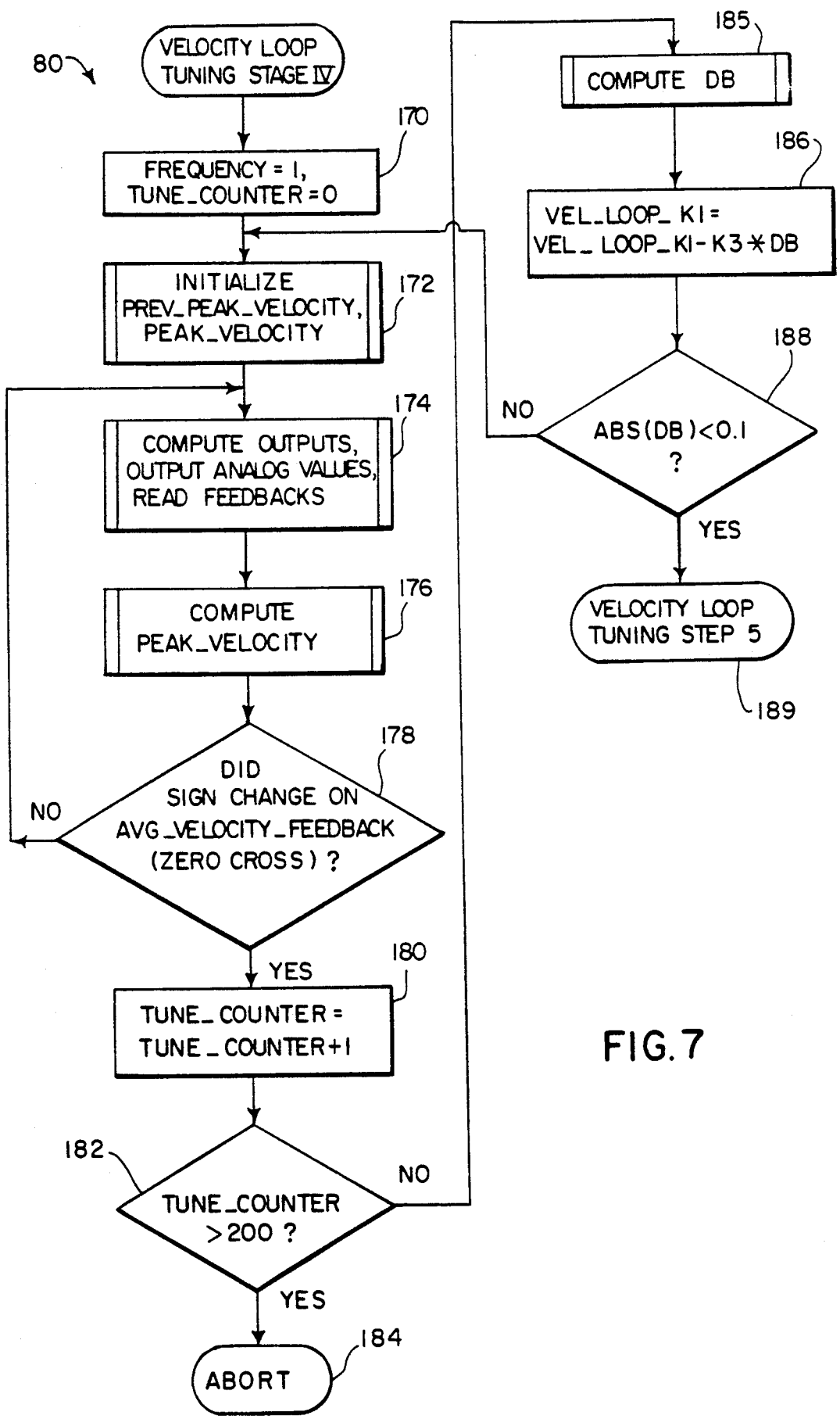
FIG. 7 is a detailed flow chart of the steps performed in Stage IV of FIG. 2 for a velocity loop.

Referring to FIG. 7, for the velocity loop 52, Stage IV reduces the frequency of the velocity command signal 53 to one hertz to adjust the I-gain value of integral gain block 58 to achieve approximately 0 db close loop gain. Accordingly, at process block 170 of Stage IV, the frequency of the velocity command is set equal one hertz and Tune Counter is initialized to zero for the same purposes as have been previously described.

At subsequent process blocks 172 through 185, values of the peak amplitude of the velocity feedback signal 26 are computed and compared to the amplitude of the velocity command 53 in a manner identical to process blocks 108 through 121 of FIG. 5 to provide a close loop gain value (DB) of the velocity loop 52 in decibels.

At process block 186, the I-gain value represented by the variable: Vel Loop KI is reduced by a fraction (K3) times the decibel value (DB).

At decision block 188, the decibel value (DB) is then compared to 0 db, the target decibel value and if it is within 0.1 db of 0 db, Stage IV is exited at process block 189. If the decibel values of the closed loop gain (DB) is not within the 0.1 db tolerance, the program loops back to the top of process block 172 immediately following the initialization of process block 170.

Again the magnitude of K3 is determined empirically so that the tuning loop of Stage IV executes in a reasonable period of time so as to prevent the desired tolerance of 0.1 db of never being satisfied. At the conclusion of Stage IV, the amplitude of the velocity command signal is gradually reduced to zero and the velocity loop tuning process is complete.

Once the velocity loop 52 is tuned, the program then proceeds to tune the position loop 32. The position loop 32 is tuned in a manner substantially identical to that which has been described with respect to Stages I, II and III represented by process blocks 74 through 78 of FIG. 2 as have been previously described. The difference in the tuning of the position loop 32 is in the inputs and outputs operated on by the tuning Stages. Whereas in the tuning of the velocity loop 52, the velocity command 53 and the velocity feedback signal 26 are employed in deriving closed loop gain and closed loop phase lag, and the P-gain value of proportional gain block 56 is adjusted, for the position loop 32, the position command 14 and the position feedback signal 28 are examined in determining closed loop gain and closed loop phase lag and the P-gain value of the proportional gain block 36 is adjusted. Stages I through III are otherwise substantially identical.

During the tuning of the position loop 32 the velocity loop 52 remains enabled. The current value of the position feedback signal 28 is stored and the position command 14 generated by the position loop tuning block 68 is selected to cause a position oscillation about this center position and to terminate the tuning procedure at this same center position.

The sinusoidal position command 14 used for the tuning process is initialized to a frequency of one hertz and an amplitude equal to 1/32 of the maximum distance that the motor 24 can move at maximum speed in one second. This amplitude and distance is chosen so that the motion during the tuning loop procedure will be small but large enough to provide sufficient position feedback information.

In keeping with the noted differences between the tuning of the velocity loop 52 and the position loop 32, the tuning of the position loop 32 averages the variables Peak-Distance (in lieu of Peak-Velocity) and Prev-Peak-Distance (in lieu of Prev Peak Velocity) to reduce the effect of imbalance in the servo system. Also, the tuning of the position loop 32 checks the control system 12 for torque and velocity limits instead of only torque limits as done in the velocity loop tuning described above.

Figure 8:
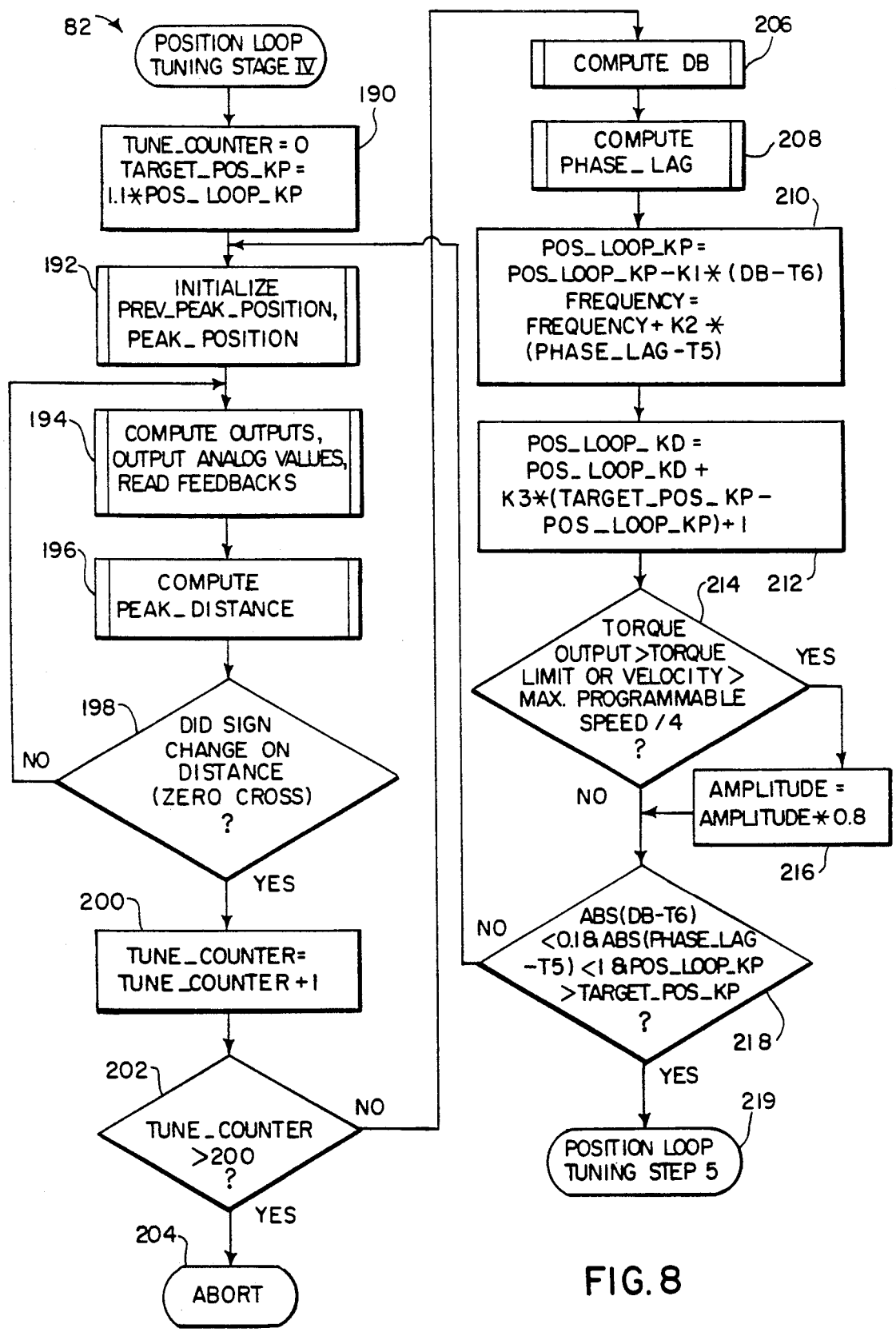
FIG. 8 is a detailed flow chart of the steps performed in Stage IV for a position loop.

The similarity of position loop tuning and velocity loop tuning differ with Stage IV as a result of the differing criteria for position as opposed to velocity loop control. Referring to FIG. 8, at the beginning of Stage IV for the position loop, indicated generally as process block 80 of FIG. 2, the Tune Counter variable is set equal to zero and a target P-gain value (Target Pos KP) is established at 110% of the P-gain value set at Stage III, generally shown by process block 190.

At process block 192, the variables Prev Peak Position and Peak Position are re-initialized in a manner analogous to that previously described with respect to process block 82 of FIG. 4. These variables indicate the peak position deviation and previous peak position deviation for a previous half-cycle of a sine wave excitation of the servo system as indicated by position feedback 28 shown in FIG. 1.

At subsequent process block 194, a position command 14 is provided to the position loop 32 and position feedback 28 received from the motor 24 in response to that position feedback.

The variable Peak Distance is updated at process block 196 in a manner analogous to that previously described with respect to process blocks 86 and 88 of FIG. 4, and at process block 198, a zero crossing is detected in a manner analogous to that of process block 90 of FIG. 4. If no zero crossing was detected, the program of Stage IV loops back to the top of process block 194, but if a zero crossing has occurred, Tune Counter is incremented and tested at process blocks 200 through 204 in a manner analogous to process blocks 92 through 96 of FIG. 4. If the Tune Counter limit has not been exceeded at process blocks 206 and 208, the close loop gain (DB) and the Phase Lag are calculated in a manner analogous to that indicated in FIG. 4 at process block 8 and FIG. 5 at process block 132

At process block 210, the P-gain value of proportional gain block 36 is incremented by the fraction (K1) of the difference between the actual close loop gain (DB) and the target P-gain value as computed in process block 190 and as indicated by the variable T6. In the preferred embodiment, T6 is the same as variable T3 described above. The frequency of the position command 14 is also adjusted to preserve the desired phase lag by changing that frequency by the fraction (K2) of the difference between the variable Phase Lag and T5, the latter which is generally identical to T2.

At process block 212, the D-gain value of the derivative gain block 42 of the position loop 32 is adjusted by the fraction (K3) times the difference between the previously computed target P-gain (Target Pos KP) and the actual P-gain plus one. The "plus one" is a bias to speed the change of the D-gain value to insure that the P-gain value will eventually exceed the target P-gain value.

The torque command 20 and velocity command 53 associated with the operation of the loops 32 and 52 are checked against their predefined limits and the amplitude of the position command 14 is decreased by 80% if either of the torque or velocity limits is exceeded, as indicated in process blocks 214 and 216 corresponding generally to process block 134 and 136 of FIG. 5.

At the decision block 218, following the checking of the torque and velocity limits, the difference between the close loop gain and the target gain (T6) and the close loop phase lag and the target phase lag (T5) and the P-gain value and the target P-gain value (Target Pos KP) are examined. If these first two values are within the designated tolerances of 0.1 db and one degree, respectively, and if the actual P-gain value is greater than the target, the Stage IV procedure is exited at process block 219, however, if the limits have not been reached, the program loops back to the top of process block 192 following process block 190 to make further adjustments.

As in the tuning of the velocity loop, at the conclusion of Stage IV of the tuning of the position loop 32, the amplitude of the position command 14 is gradually decreased and the tuning process is terminated.

If for any reason the automatic tuning procedure fails, as indicated by the Tune-Counter variable exceeding its limit, message is provided to the operator indicating that the automatic tuning procedure has been aborted.

The above description has been that of a preferred embodiment of the present invention. It will occur to those that practice the art that many modifications may be made without departing from the spirit and scope of the invention. For example, the control system need not be a position velocity control system but an arbitrary control system suitable for PID control may be adopted. Also, clearly damping ratios other than critical damping may be employed provided the system may be modeled as a second order linear system. In order to apprise the public of the various embodiments that may fall within the scope of the invention, the following claims are made.

We claim:

1. An autotuning apparatus comprising:

a sine wave generator producing a sine wave as an input signal;

a feedback control system receiving the input signal and generating an error signal, the error signal being received by a proportional amplifier having a proportional gain factor to generate a command signal, the command signal controlling a system having a physical transfer function and producing an output that may be measured to generate a feedback signal, and wherein the error signal is the difference between the input signal and the feedback signal;

a phase detector for generating a phase signal proportional to the phase difference between the input signal and the feedback signal;

a gain detector for generating a gain signal proportional to the ratio of the feedback signal to the input signal;

a damping calculator for deducing a target phase difference and target gain value from a model of a second order system and based on a predetermined desired damping ratio; and a gain adjuster for adjusting the proportional gain of the proportional amplifier so that the gain signal equals the target gain value and the phase difference signal equals the target phase difference.

2. The apparatus of claim 1 wherein the gain adjuster first adjusts the proportional gain of the proportional amplifier to an overdamped gain and overdamped phase difference prior to adjusting the proportional gain of the proportional amplifier to produce the target gain value, wherein the overdamped gain and overdamped phase difference are deduced from a model of a second order system and based on an overdamped damping ratio greater than the desired damping ratio.

3. The apparatus of claim 1 including an initializer for adjusting the gain to a value of substantially zero decibels prior to the operation of the gain adjuster.

4. The apparatus of claim 1 where the control system also includes a derivative amplifier having a derivative gain and wherein the apparatus includes a second gain adjuster for adjusting the derivative gain so that the proportional gain is a predetermined amount greater than the proportional gain obtained by the apparatus when the derivative gain is zero.

5. The apparatus of claim 1 wherein the control system includes also an integral amplifier having an integral gain and wherein the apparatus includes a second gain adjuster operating and communicating with the sine wave generator to set the sine wave frequency to a predetermined low frequency and for setting integral gain to produce 0 db gain at that predetermined low frequency.

6. A method for adjusting gains in a proportional-integral regulator for an industrial process or motion controller, the method comprising the steps of:

(a) inputting a sinusoidal input command at a frequency of less than 5 hertz and an amplitude of less than 20% of maximum amplitude;

(b) adjusting the gain of the proportional branch of the proportional-integral regulator to reach a target ratio of output amplitude to input command amplitude; and (c) adjusting the frequency of the input command so that phase of an output signal from the proportional-integral regulator lags the phase of the input command by a preselected phase lag angle corresponding to a preselected target damping ratio of a second order system.

7. The method of claim 6, including the additional steps of:

readjusting the frequency of the sinusoidal input command to a frequency of less than 5 hertz; and (e) adjusting the gain of an integral branch of the proportional-integral regulator to reach a target ratio of output amplitude to input command amplitude.

8. The method of claim 6, wherein the proportional-integral regulator is a velocity regulator; and prior to steps (a)–(c), disabling a proportional-integral regulator for position control that is arranged to generate a velocity input command to the velocity regulator as the input command.

9. The method of claim 6, including the additional step of:

(f) adjusting gain of a derivative branch to increase the gain of the proportional branch in range from 10%–20% greater than the gain measured at the end of step (c) while maintaining the preselected phase lag.

10. The method of claim 8, wherein during step (c) to reach a predetermined damping ratio, velocity output and torque output from the velocity proportional-integral regulator are monitored and if velocity or torque limit is approached, amplitude of the input command is decreased.

11. The method of claim 6, wherein the preselected phase lag angle is approximately 45°.

* * * * *